US011080536B2

(12) United States Patent
Nishimura

(10) Patent No.: US 11,080,536 B2
(45) Date of Patent: Aug. 3, 2021

(54) IMAGE PROCESSING DEVICE, NON-TRANSITORY READABLE RECORDING MEDIUM STORING PROGRAM, INFORMATION PROCESSING SYSTEM, AND CONTROL METHOD OF IMAGE PROCESSING DEVICE

(71) Applicant: Toyota Jidosha Kabushiki Kaisha, Toyota (JP)

(72) Inventor: Kazuya Nishimura, Okazaki (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 64 days.

(21) Appl. No.: 16/527,378

(22) Filed: Jul. 31, 2019

(65) Prior Publication Data

US 2020/0104605 A1    Apr. 2, 2020

(30) Foreign Application Priority Data

Oct. 2, 2018    (JP) .............................. JP2018-187467

(51) Int. Cl.
*G06K 9/00* (2006.01)
*G06K 9/46* (2006.01)
*G06K 9/20* (2006.01)

(52) U.S. Cl.
CPC ....... *G06K 9/00791* (2013.01); *G06K 9/2054* (2013.01); *G06K 9/46* (2013.01); *G06K 2209/15* (2013.01); *G06K 2209/23* (2013.01)

(58) Field of Classification Search
CPC ................ B60R 1/00; B60R 2300/105; B60R 2300/303; B60R 2300/304; B60R 2300/605; B60R 2300/8066; H04N 5/23222; H04N 5/23293; G06K 2209/15; G06K 2209/23; G06K 9/00791; G06K 9/2054; G06K 9/46

See application file for complete search history.

(56) References Cited

U.S. PATENT DOCUMENTS 9,350,914 B1 *   5/2016   Kaur ...................... G06T 5/002
2010/0296705 A1 * 11/2010  Miksa .................... G06T 5/003
                                                          382/106

(Continued)

FOREIGN PATENT DOCUMENTS

CN       101998113 A      3/2011
JP       2017-211760 A   11/2017

*Primary Examiner* — Michael J Vanchy, Jr.
(74) *Attorney, Agent, or Firm* — Dinsmore & Shohl LLP

(57) ABSTRACT

An image processing device is provided with a communication device and a processor. The processor is configured to acquire a first video obtained by imaging outside scenery of a first vehicle, when the processor detects that a second vehicle appears on the first video, implement image processing that degrades visibility of a video with respect to a first image area corresponding to at least a part of the second vehicle on the first video, when the processor detects that the second vehicle appears on the first video and then a specific part of the second vehicle appears on the first video, end the image processing with respect to the first image area and implement image processing that degrades visibility of a video with respect to a second image area corresponding to the specific part of the second vehicle on the first video.

9 Claims, 11 Drawing Sheets

(56) References Cited

U.S. PATENT DOCUMENTS

| | | | |
|---|---|---|---|
| 2011/0043341 A1* | 2/2011 | Kumagami | H04N 5/23222 340/425.5 |
| 2014/0029804 A1* | 1/2014 | Kawaguchi | G06T 11/60 382/105 |
| 2020/0014857 A1* | 1/2020 | Hei | H04N 5/23206 |

* cited by examiner

IMAGE PROCESSING DEVICE, NON-TRANSITORY READABLE RECORDING MEDIUM STORING PROGRAM, INFORMATION PROCESSING SYSTEM, AND CONTROL METHOD OF IMAGE PROCESSING DEVICE

CROSS REFERENCE TO RELATED APPLICATIONS

This application claims priority to Japanese Patent Application No. 2018-187467 filed on Oct. 2, 2018, incorporated herein by reference in its entirety.

BACKGROUND

1. Technical Field

The present disclosure relates to an image processing device, a non-transitory readable recording medium storing a program, an information processing system, and a control method of the image processing device.

2. Description of Related Art

In the related art, an image processing technique of processing a video imaged by using a camera or the like is known. For example, Japanese Unexamined Patent Application Publication No. 2017-211760 (JP 2017-211760 A) discloses a technique of estimating a position of a predetermined area of a moving object appearing in a second resolution image having higher resolution than a first resolution image based on movement information of the moving object detected based on a plurality of first resolution images captured from a moving image and of performing an image analysis based on the position of the predetermined area.

SUMMARY

In general, a predetermined object (for example, license plate of vehicle) on a video is recognized, and mask processing (for example, mosaic processing) of degrading visibility is implemented with respect to the recognized object. For example, in a service that provides the video to an unspecified user, the implementation of the mask processing is useful from the viewpoint of personal information protection. However, in the related art, the mask processing may not always be appropriately implemented. For example, when an object enters into an imaging range of the camera, the whole object may not fit in a frame and solely a part of the object may appear. When solely a part of the object appears, it is impossible to detect the object in the image. As a result, it is impossible to always implement the mask processing. Therefore, it is desired to improve the certainty that the mask processing is executed with respect to the predetermined object on the video.

The present disclosure relates to an image processing device that improves the certainty that the mask processing is executed with respect to the predetermined object on the video, a non-transitory readable recording medium storing a program, an information processing system, and a control method of the image processing device.

A first aspect of the present disclosure relates to an image processing device including a communication device and a processor. The processor is configured to acquire a first video obtained by imaging outside scenery of a first vehicle by using the communication device, when the processor detects that a second vehicle other than the first vehicle appears on the first video, implement image processing that degrades visibility of a video with respect to a first image area corresponding to at least a part of the second vehicle on the first video, and when the processor detects that the second vehicle appears on the first video and then a specific part of the second vehicle appears on the first video, end the image processing with respect to the first image area and implement image processing that degrades visibility of a video with respect to a second image area corresponding to the specific part of the second vehicle on the first video.

In the image processing device according to the first aspect of the present disclosure, the specific part of the second vehicle may include at least one of a license plate and a window of the second vehicle.

In the image processing device according to the first aspect of the present disclosure, the first video may be a video obtained by imaging outside scenery in a first direction when viewed from the first vehicle. The processor may be configured to further acquire a second video obtained by imaging outside scenery in a second direction different from the first direction when viewed from the first vehicle by using the communication device, detect a vehicle appearing on the second video as the second vehicle, extract feature information indicating a feature of the second vehicle from the second video, and when the processor detects that an object appears on the first video, determine whether the object is the second vehicle using the feature information.

In the image processing device according to the first aspect of the present disclosure, the processor may be configured to detect a vehicle appearing on the second video and approaching the first vehicle as the second vehicle.

In the image processing device according to the first aspect of the present disclosure, the processor may be configured to, when the processor detects the vehicle appearing on the second video as the second vehicle, start image recognition processing for detecting the appearance of the object on the first video.

In the image processing device according to the first aspect of the present disclosure, the first video may be a video obtained by imaging outside scenery in a first direction when viewed from the first vehicle. The processor may be configured to acquire a notification that an object approaching the first vehicle from a second direction different from the first direction when viewed from the first vehicle is detected by using the communication device, and start image recognition processing for detecting the appearance of the second vehicle on the first video in response to the acquisition of the notification.

A second aspect of the present disclosure relates to a non-transitory readable recording medium storing a program for causing a processor to execute a control method of an image processing device including the processor and a communication device. The program causes the processor to execute a control process of the image processing device. The control process includes acquiring a first video obtained by imaging outside scenery of a first vehicle by using the communication device, when detection is made that a second vehicle appears on the first video, implementing image processing that degrades visibility of a video with respect to a first image area corresponding to at least a part of the second vehicle on the first video, and when detection is made that the second vehicle appears on the first video and then a specific part of the second vehicle appears on the first video, ending the image processing with respect to the first image area and implementing image processing that degrades visibility of a video with respect to a second image area corresponding to the specific part of the second vehicle on the first video.

A third aspect of the present disclosure relates to an information processing system including a first vehicle and a server configured to communicate with the first vehicle. The first vehicle is configured to transmit a first video obtained by imaging outside scenery to the server. The first vehicle or the server is configured to, when the first vehicle or the server detects that a second vehicle appears on the first video, implement image processing that degrades visibility of a video with respect to a first image area corresponding to at least a part of the second vehicle on the first video, and when the first vehicle or the server detects that the second vehicle appears on the first video and then a specific part of the second vehicle appears on the first video, end the image processing with respect to the first image area and implement image processing that degrades visibility of a video with respect to a second image area corresponding to the specific part of the second vehicle on the first video. The server is configured to transmit the first video to a client.

A fourth aspect of the present disclosure relates to a control method of the image processing device including a communication device and a processor. The control method includes acquiring a first video obtained by imaging outside scenery of a first vehicle by using the communication device by the processor, when detection is made that a second vehicle appears on the first video, implementing image processing that degrades visibility of a video with respect to a first image area corresponding to at least a part of the second vehicle on the first video by the processor, and when detection is made that the second vehicle appears on the first video and then a specific, part of the second vehicle appears on the first video, ending the image processing with respect to the first image area and implementing image processing that degrades visibility of a video with respect to a second image area corresponding to the specific part of the second vehicle on the first video by the processor.

With the image processing device, the non-transitory readable recording medium storing the program, the information processing system, and the control method of the image processing device according to the aspects of the present disclosure, the certainty that the mask processing is executed with respect to a predetermined subject on the video is improved.

BRIEF DESCRIPTION OF THE DRAWINGS

Features, advantages, and technical and industrial significance of exemplary embodiments of the present disclosure will be described below with reference to the accompanying drawings, in which like numerals denote like elements, and wherein.

DETAILED DESCRIPTION

Hereinafter, embodiments of the present disclosure will be described.

First Embodiment

Figure 1:
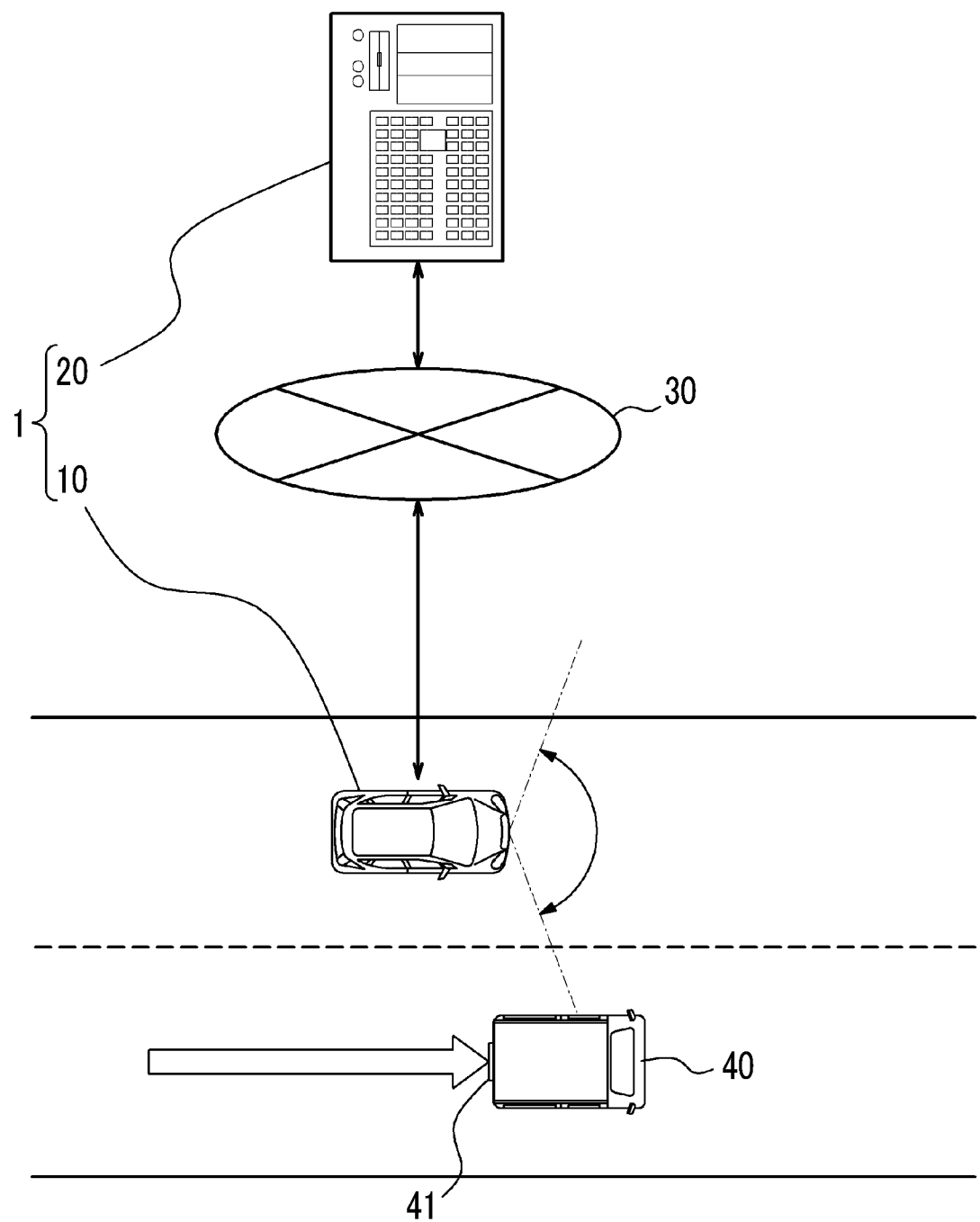
FIG. 1 is a diagram showing a schematic configuration of an information processing system according to a first embodiment of the present disclosure.

An outline of an information processing system 1 according to a first embodiment of the present disclosure will be described with reference to FIG. 1. The information processing system 1 is provided with a first vehicle 10 and a server 20. Example of the first vehicle 10 is an automobile, but the first vehicle 10 is not limited thereto and may be a predetermined vehicle. FIG. 1 exemplifies solely one first vehicle 10 for convenience of the description, but the information processing system 1 may be provided with the predetermined number of first vehicles 10. The first vehicle 10 is provided with, for example, an on-vehicle camera and can generate a first video obtained by imaging outside scenery in a first direction when viewed from the first vehicle 10. The "first direction" in the embodiment is described as the front of the first vehicle 10 but is not limited thereto. The first vehicle 10 can recognize an object appearing on the first video by image recognition processing. The server 20 includes one or a plurality of information processing devices (for example, server device) capable of communicating with each other. The first vehicle 10 and the server 20 can communicate through a network 30 including, for example, a mobile communication network, the Internet, and the like.

As the outline of the embodiment, the first vehicle 10 generates the first video obtained by imaging the outside scenery in the front viewed from the first vehicle 10 by using, for example, the on-vehicle camera. A range indicated by dashed lines in FIG. 1 shows the field of view of the on-vehicle camera. Here, a scene where a second vehicle 40 passes the first vehicle 10 from the rear is considered. As shown in FIG. 1, when the second vehicle 40 enters into the field of view of the on-vehicle camera, the second vehicle 40 appears on the first video. Hereinafter, when the second vehicle 40 as the subject and the second vehicle 40 on the first video are distinguishingly described, the latter is also referred to as a "second vehicle 40i". When the first vehicle 10 detects that the second vehicle 40 appears on the first video, the first vehicle 10 implements image processing (hereinafter also referred to as mask processing") that degrades the visibility of the video with respect to a first image area corresponding to at least a part of the second vehicle 40i on the first video. An example of the mask processing is mosaic processing, processing of superimposing a mask image, or processing of degrading resolution, but is not limited thereto.

Figure 2:
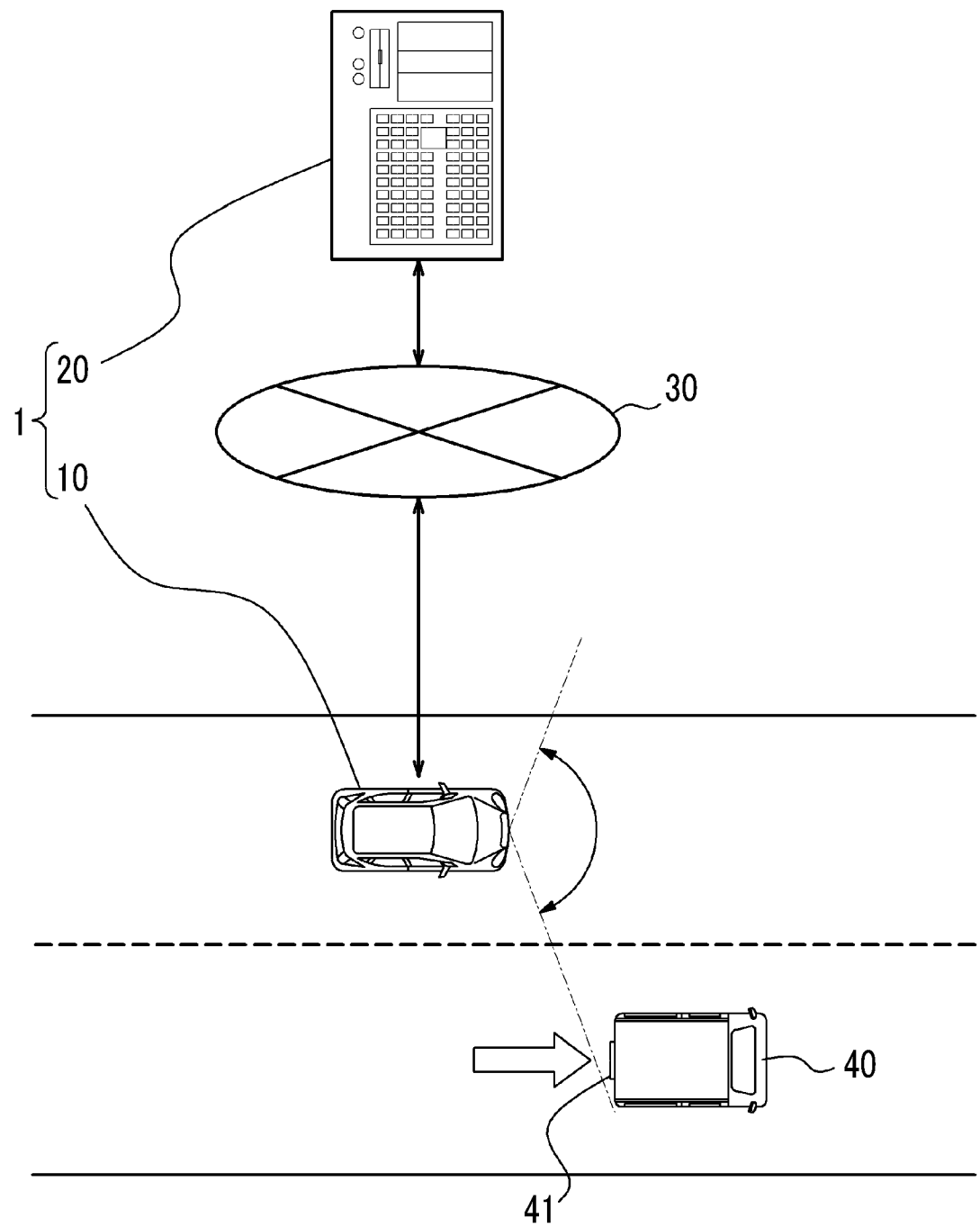
FIG. 2 is a diagram showing a schematic configuration of the information processing system according to the first embodiment of the present disclosure.

Thereafter, a scene where the second vehicle 40 further advances to the front with respect to the first vehicle 10 is considered. As shown in FIG. 2, when a specific part 41 of the second vehicle 40 enters into the field of view of the on-vehicle camera, the specific part 41 appears on the first video. Hereinafter, when the specific part 41 as the subject and the specific part 41 on the first video are distinguishingly described, the latter is also referred to as a "specific part 41i". The "specific part" in the embodiment is described as a license plate provided on the back surface of the second vehicle 40 but is not limited thereto. When the first vehicle 10 detects that the second vehicle 40 appears on the first video and then the specific part 41 of the second vehicle 40 appears on the first video as described above, the first vehicle 10 ends the implementation of the mask processing with respect to the first image area and implements the mask processing with respect to the second image area corresponding to the specific part 41i of the second vehicle 40i on the first video.

In this manner, according to the embodiment, the second vehicle 40i on the first video is subjected to the mask processing before the specific part 41 of the second vehicle 40 appears on the first video. Therefore, even when the specific part 41i of the second vehicle 40i cannot be detected on the first video, for example, solely a part of the specific part 41 of the second vehicle 40 appears on the first video or the like, the certainty that the mask processing is implemented with respect to the specific part 41i on the first video is improved.

The first vehicle 10 may transmit the first video subjected to the mask processing to the server 20. The server 20 may store the first video received from the first vehicle 10 and may transmit the stored first video to a client, for example, in response to a request from the client or automatically. With the related configuration, for example, in a service that provides the first video to a third party, it is possible to protect personal information of a user of the second vehicle 40 appearing on the first video.

Next, each configuration of the information processing system 1 will be described in detail.

Configuration of First Vehicle

Figure 3:
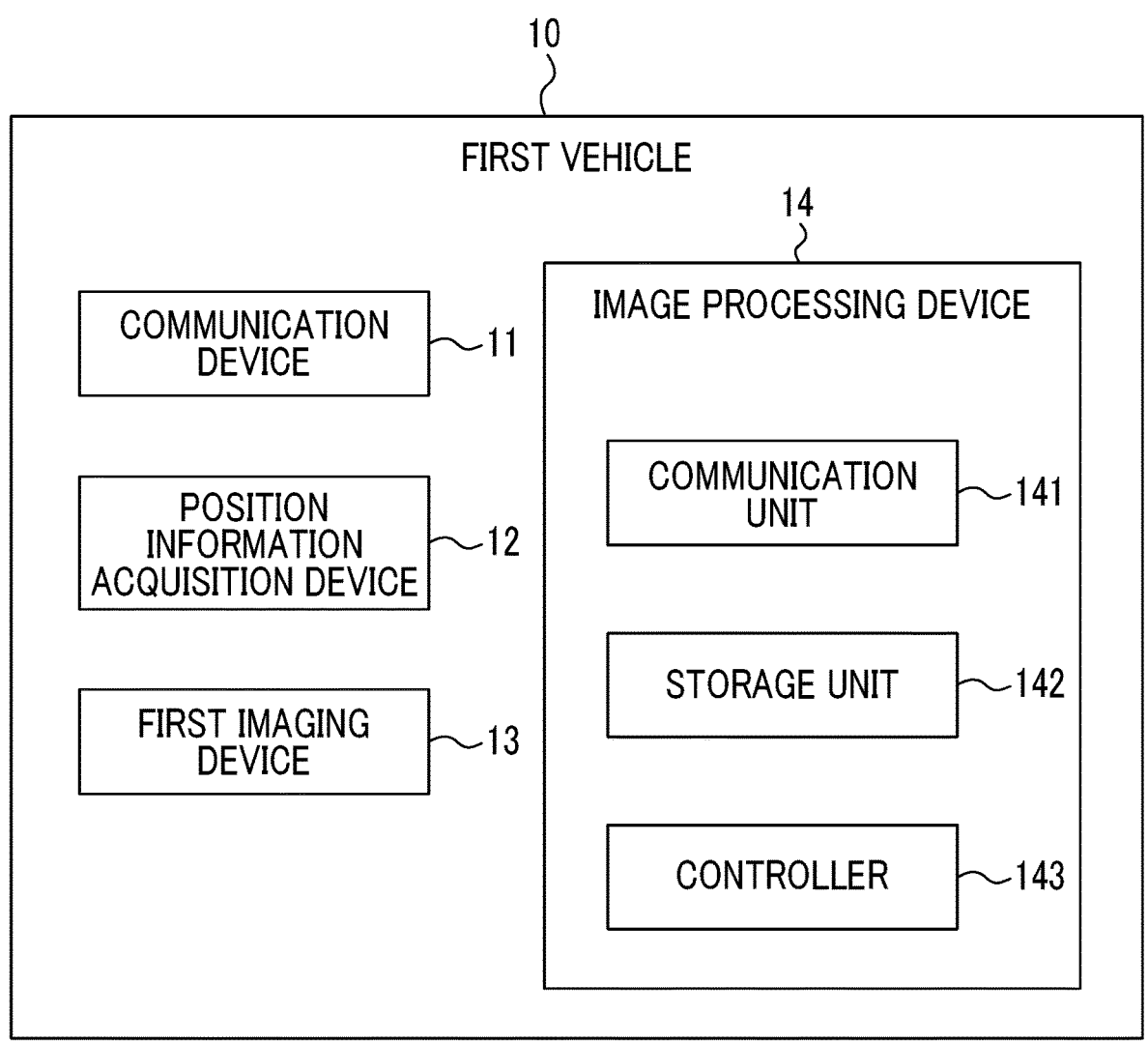
FIG. 3 is a block diagram showing a schematic configuration of a first vehicle according to the first embodiment.

As shown in FIG. 3, the first vehicle 10 is provided with a communication device 11, a position information acquisition device 12, a first imaging device 13, and an image processing device 14. The communication device 11, the position information acquisition device 12, the first imaging device 13, and the image processing device 14 may be respectively built in the first vehicle 10 or may be detachably provided in the first vehicle 10. The communication device 11, the position information acquisition device 12, the first imaging device 13, and the image processing device 14 are connected to each other in a communicable manner through, for example, an on-vehicle network such as a controller area network (CAN) or a dedicated line.

The communication device 11 is an on-vehicle communication apparatus such as a data communication module (DCM). Specifically, the communication device 11 includes a communication module to be connected to the network 30. The communication module includes communication modules corresponding to mobile communication standards such as 4th Generation (4G) and 5th Generation (5G) but is not limited thereto. In the embodiment, the first vehicle 10 is connected to the network 30 through the communication device 11. The communication device 11 may transmit, for example, predetermined information relating to the first vehicle 10 to the server 20 as probe data. Specifically, the probe data may include identification information, position information, traveling route information of the first vehicle 10, information indicating a road link while the first vehicle 10 travels, time information, and the like, but is not limited thereto.

The position information acquisition device 12 is a device that acquires the position information of the first vehicle 10. Specifically, the position information acquisition device 12 includes a receiver corresponding to a satellite positioning system. The receiver may include, for example, a global positioning system (GPS) receiver. In the embodiment, the first vehicle 10 acquires the position information of own vehicle by using the position information acquisition device 12.

The first imaging device 13 is a device that generates a video obtained by imaging a subject in the field of view. The first imaging device 13 is provided in the first vehicle 10 so as to be able to image the outside scenery in the first direction when viewed from the first vehicle 10. The "first direction" in the embodiment is described as the front viewed from the first vehicle 10 but is not limited thereto. An example of the first imaging device 13 may be an on-vehicle camera (front camera) to be used for driving assistance of the vehicle, a drive recorder, or the like. In the embodiment, the first vehicle 10 generates the first video obtained by imaging the outside scenery in the front viewed from the first vehicle 10 by using the first imaging device 13.

The image processing device 14 is an information processing device having an image processing function. The image processing device 14 may be, for example, a navigation device. Specifically, the image processing device 14 is provided with a communication unit 141, a storage unit 142, and a controller 143.

The communication unit 141 includes a communication module that performs the communication through the on-vehicle network or the dedicated line. In the embodiment, the communication unit 141 acquires the first video from the first imaging device 13.

The storage unit 142 includes one or more memories. An example of the "memory" in the embodiment is a semiconductor memory, a magnetic memory, or an optical memory, but is not limited thereto. Each memory included in the storage unit 142 may function as, for example, a main storage device, an auxiliary storage device, or a cache memory. The storage unit 142 stores predetermined information to be used for the operation of the image processing device 14. For example, the storage unit 142 may store a system program, an application program, embedded software, and the like. The information stored in the storage unit 142 may be updatable by, for example, information to be acquired from the network 30 through the communication device 11.

The controller 143 is provided with one or more processors. The "processor" in the embodiment is a general-purpose processor, a dedicated processor specialized for specific processing, or the like, but is not limited thereto. For example, an electronic control unit (ECU) mounted on the first vehicle 10 may function as the controller 143. The controller 143 controls the operation of the entire image processing device 14.

For example, the controller 143 starts the image recognition processing for detecting the appearance of the object on the first video. In the embodiment, the controller 143 starts the image recognition processing for detecting the appearance of the second vehicle 40 passing the first vehicle 10 on the first video. A predetermined image recognition algorithm such as pattern matching, feature point extraction, or machine learning is adoptable for the image recognition processing.

Figure 4:
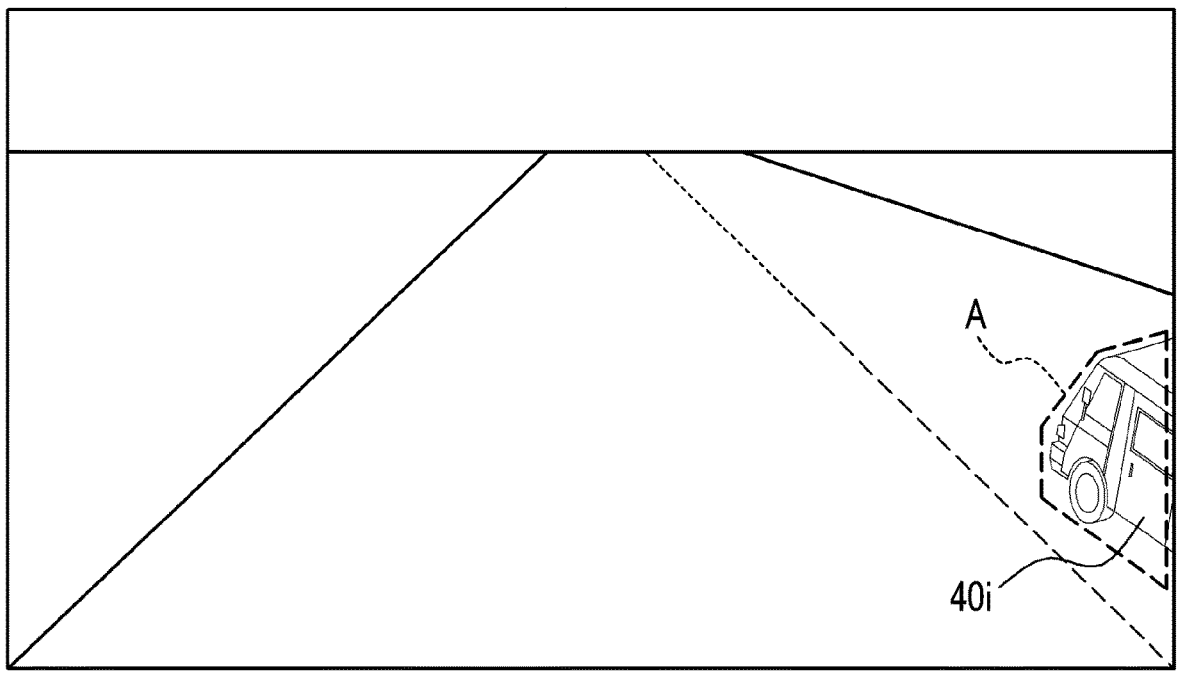
FIG. 4 is a diagram showing an example of a first image area on a first video.

When the controller 143 detects that the second vehicle 40 appears on the first video, the controller 143 decides a first image area A on the first video corresponding to at least a part of the second vehicle 40i on the first video to implement the mask processing with respect to the first image area A. Specifically, the first image area A may be an image area corresponding to the whole second vehicle 40i or may be an image area corresponding to a part of the second vehicle 40i on the first video as shown in FIG. 4. The first image area A may not strictly match at least a part of the second vehicle 40i on the first video. For example, the first image area A may be an image area having a predetermined shape (for example, circle, rectangle, or the like) including at least a part of the second vehicle 40i.

Figure 5:
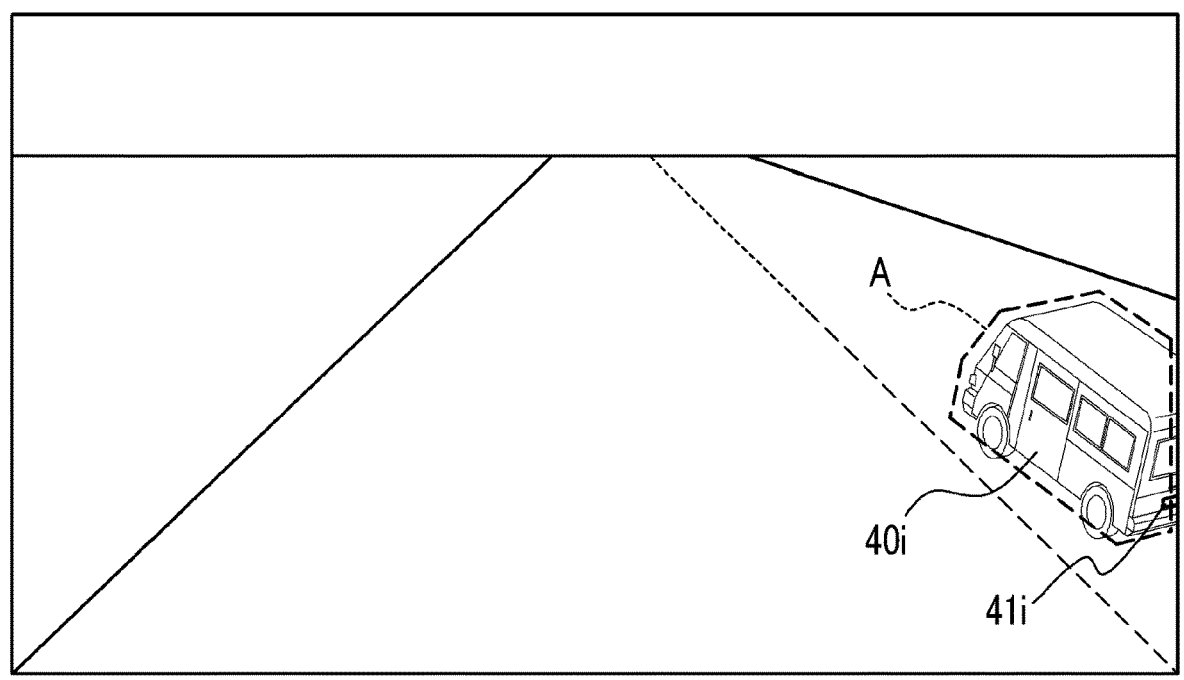
FIG. 5 is a diagram showing an example of the first image area on the first video.

The controller 143 continues the implementation of the mask processing with respect to the first image area A until the controller 143 detects that the second vehicle 40 appears on the first video and then the specific part 41 (in the embodiment, license plate) of the second vehicle 40 appears on the first video. For example, FIG. 5 shows a state where the second vehicle 40 further advances to the front with respect to the first vehicle 10 and a part of the specific part 41 of the second vehicle 40 appears on the first video. Since the whole specific part 41 of the second vehicle 40 does not appear on the first video, the controller 143 cannot always detect that the specific part 41 of the second vehicle 40 appears on the first video. However, since the mask processing with respect to the first image area A is continuously implemented, the certainty that the mask processing is implemented even with respect to the specific part 41i of the second vehicle 40i on the first video is improved.

Figure 6:
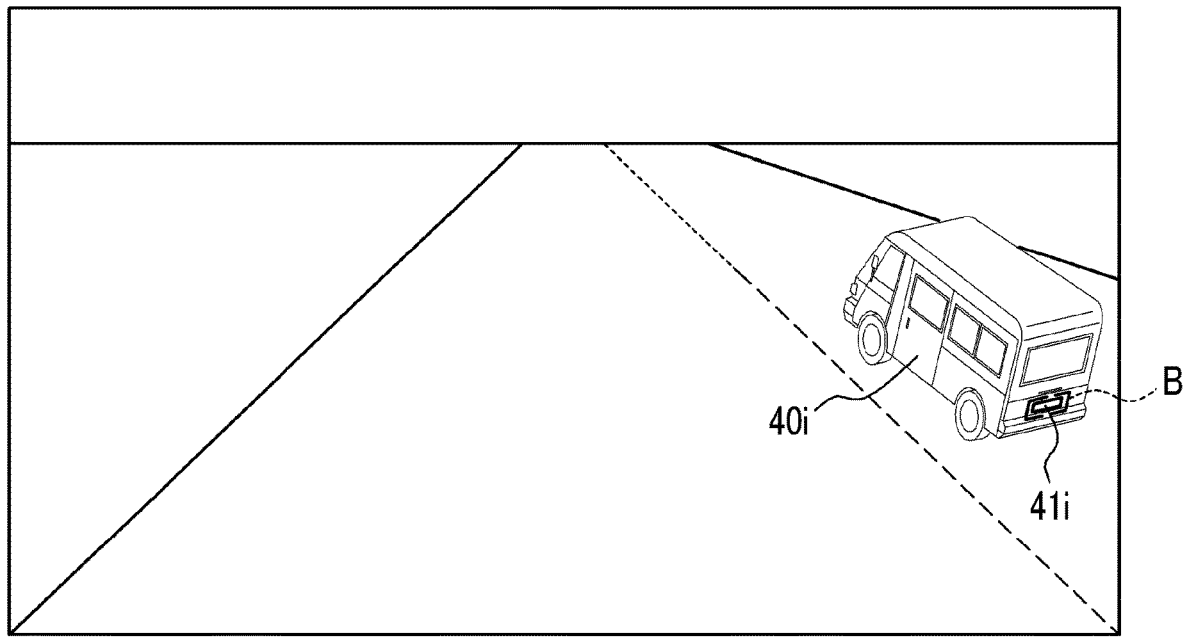
FIG. 6 is a diagram showing an example of a second image area on the first video.

When the controller 143 detects that the second vehicle 40 appears on the first video and then the specific part 41 of the second vehicle 40 appears on the first video, the controller 143 ends the implementation of the mask processing with respect to the first image area A and decides, for example, a second image area B corresponding to the specific part 41i of the second vehicle 40i on the first video as shown in FIG. 6 to implement the mask processing with respect to the second image area B. The second image area B may not strictly match the specific part 41i of the second vehicle 40i on the first video. For example, the second image area B may be an image area having a predetermined shape (for example, circle, rectangle, or the like) including the specific part 41i of the second vehicle 40i. With the related configuration, the mask processing is selectively implemented with respect to the second image area B corresponding to the specific part 41i of the second vehicle 40i on the first video. Typically, the second image area B corresponding to the specific part 41i of the second vehicle 40i is smaller than the first image area A corresponding to at least a part of the second vehicle 40i on the first video. Therefore, since the image area to be subjected to the mask processing is small compared with the image area before the appearance of the specific part 41 of the second vehicle 40 on the first video is detected, the visibility of the first video is improved. The controller 143 continues the implementation of the mask processing with respect to the second image area B until the specific part 41i of the second vehicle 40i on the first video cannot be detected.

Processing contents of the mask processing with respect to the first image area A and the mask processing with respect to the second image area B may not always be the same. For example, the mask processing with respect to the first image area A may be the mosaic processing, and the mask processing with respect to the second image area B may be the processing of degrading the resolution. In addition, for example, a degradation amount of the resolution in the mask processing with respect to the first image area A may differ from a degradation amount of the resolution in the mask processing with respect to the second image area B.

The controller 143 outputs a first video subjected to the mask processing through the communication unit 141. The first video output from the image processing device 14 is transmitted to the server 20 by the communication device 11.

Configuration of Server

Figure 7:
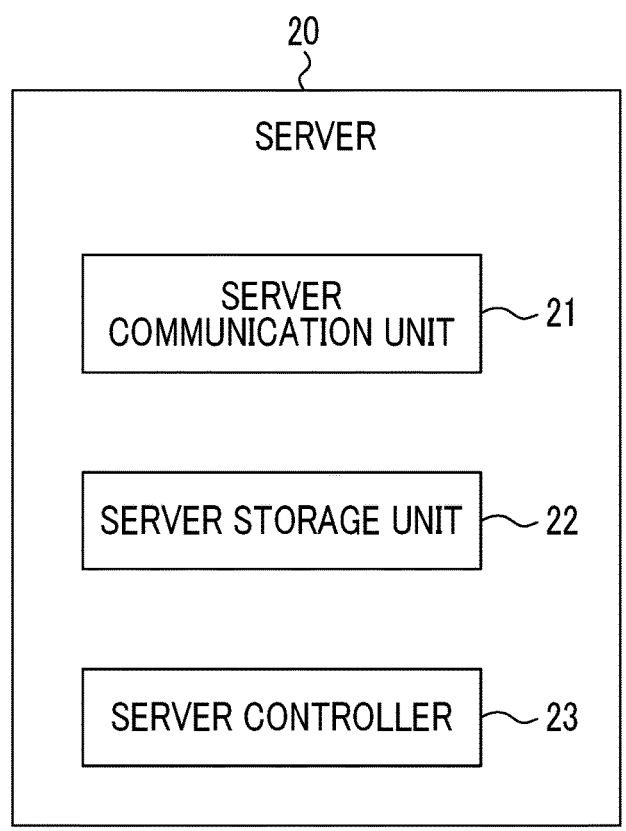
FIG. 7 is a block diagram showing a schematic configuration of a server.

As shown in FIG. 7, the server 20 is provided with a server communication unit 21, a server storage unit 22, and a server controller 23.

The server communication unit 21 includes a communication module to be connected to the network 30. The communication module includes a communication module that corresponds to, for example, a wired local area network (LAN) standard, but is not limited thereto. In the embodiment, the server 20 is connected to the network 30 through the server communication unit 21. In the embodiment, the server communication unit 21 receives the probe data and the first video subjected to the mask processing from the first vehicle 10.

The server storage unit 22 includes one or more memories. Each memory included in the server storage unit 22 may function as, for example, the main storage device, the auxiliary storage device, or the cache memory. The server storage unit 22 stores predetermined information to be used for the operation of the server 20. For example, the server storage unit 22 may store the system program, the application program, the road map information, a database that stores the probe data and the first video received from the first vehicle 10, and the like. The information stored in the server storage unit 22 may be updatable by, for example, information to be acquired from the network 30 through the server communication unit 21.

The server controller 23 includes one or more processors. The server controller 23 controls the operation of the entire server 20. For example, when the server controller 23 receives probe data from the first vehicle 10 through the server communication unit 21, the server controller 23 stores the probe data in the database of the server storage unit 22. The server controller 23 can recognize a current position, a traveling history, the route information, and the like of the first vehicle 10 with reference to the database.

For example, when the server controller 23 receives a first video subjected to the mask processing from the first vehicle 10 through the server communication unit 21, the server controller 23 stores the first video in the database of the server storage unit 22. The server controller 23 transmits at least a part of the first video stored in the database to a client, for example, in response to a request from the client or automatically.

Operation Flow of Image Processing Device

Figure 8:
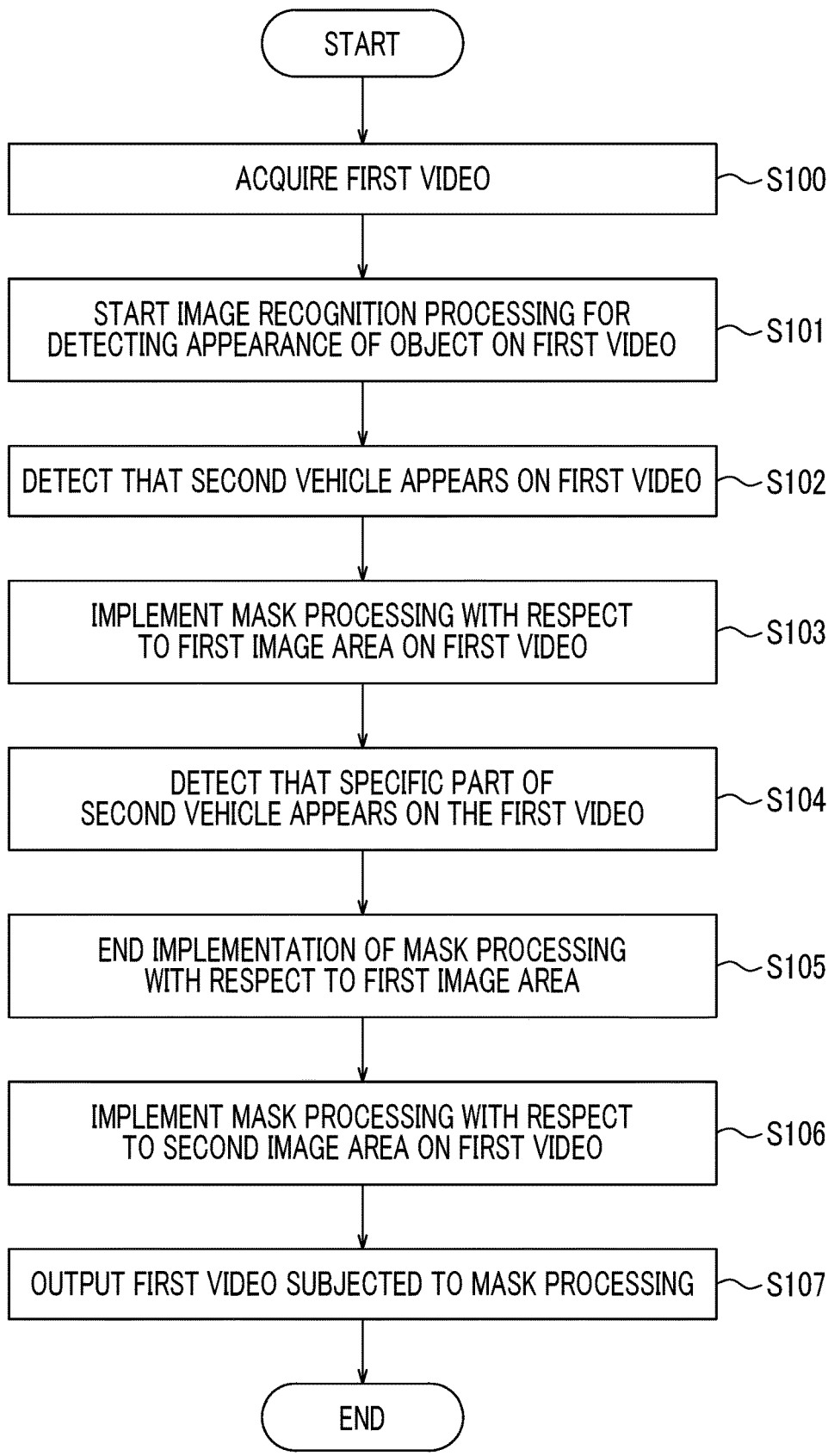
FIG. 8 is a flowchart showing an operation of an image processing device according to the first embodiment.

An operation flow of the image processing device 14 will be described with reference to FIG. 8.

Step S100: The communication unit 141 acquires the first video from the first imaging device 13.

Step S101: The controller 143 starts the image recognition processing for detecting the appearance of the object on the first video.

Step S102: The controller 143 detects that the second vehicle 40 appears on the first video.

Step S103: The controller 143 decides the first image area A on the first video corresponding to at least a part of the second vehicle 40i on the first video to implement the mask processing with respect to the first image area A.

Step S104: The controller 143 detects that the second vehicle 40 appears on the first video and then the specific part 41 of the second vehicle 40 appears on the first video.

Step S105: The controller 143 ends the implementation of the mask processing with respect to the first image area A.

Step S106: The controller 143 decides the second image area B corresponding to the specific part 41i of the second vehicle 40i on the first video to implement the mask processing with respect to the second image area B.

Step S107: The controller 143 outputs the first video subjected to the mask processing through the communication unit 141.

Operation Flow of Server

Figure 9:
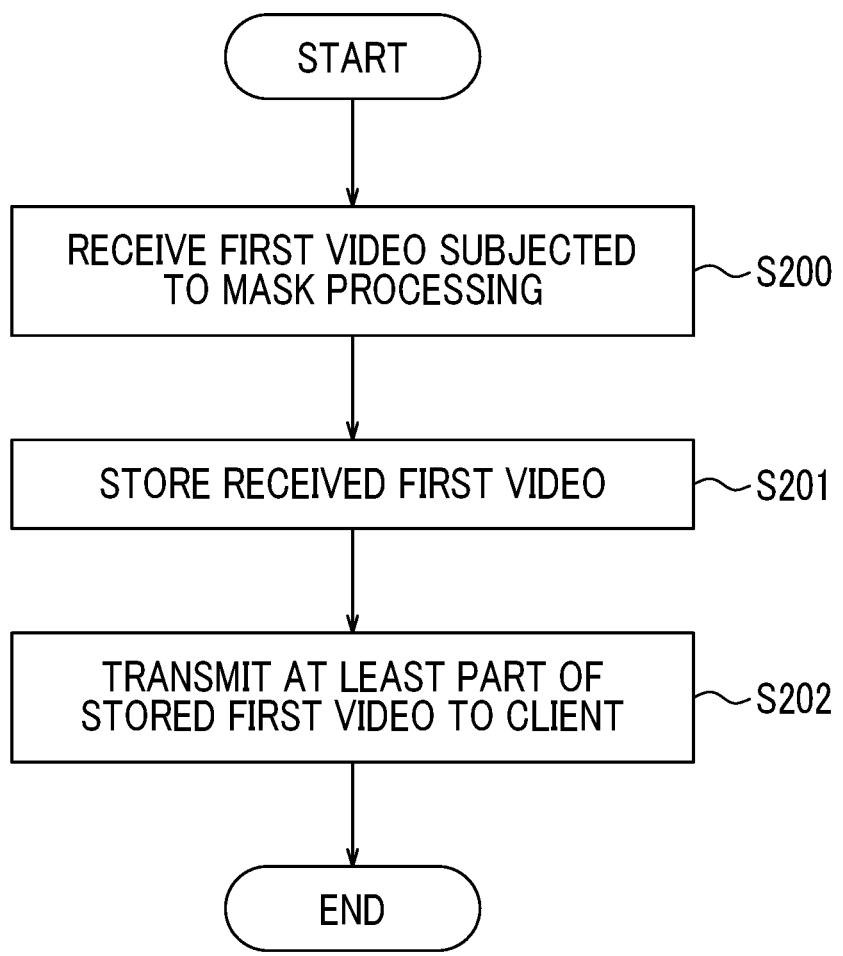
FIG. 9 is a flowchart showing an operation of the server according to the first embodiment.

An operation flow of the server 20 will be described with reference to FIG. 9.

Step S200: The server communication unit 21 receives the first video subjected to the mask processing from the first vehicle 10.

Step S201: The server controller 23 stores the received first video in the server storage unit 22.

Step S202: The server controller 23 transmits at least a part of the first video stored in the server storage unit 22 to the client.

As described above, when the image processing device 14 according to the first embodiment detects that the second vehicle 40 appears on the first video obtained by imaging the outside scenery of the first vehicle 10, the mask processing is implemented with respect to the first image area A corresponding to at least a part of the second vehicle 40i on the first video. When the image processing device 14 detects that the second vehicle 40 appears on the first video and then the specific part 41 of the second vehicle 40 appears on the first video, the image processing device 14 ends the implementation of the mask processing with respect to the first image area A and implements the mask processing with respect to the second image area B corresponding to the specific part 41i of the second vehicle 40i on the first video. With the related configuration, the second vehicle 40i on the first video is subjected to the mask processing before the specific part 41 of the second vehicle 40 appears on the first video. Therefore, even when the specific part 41i of the second vehicle 40i cannot be detected on the first video, for example, solely a part of the specific part 41 of the second vehicle 40 appears on the first video or the like, the certainty that the mask processing is implemented with respect to the specific part 41i on the first video is improved.

Second Embodiment

Figure 10:
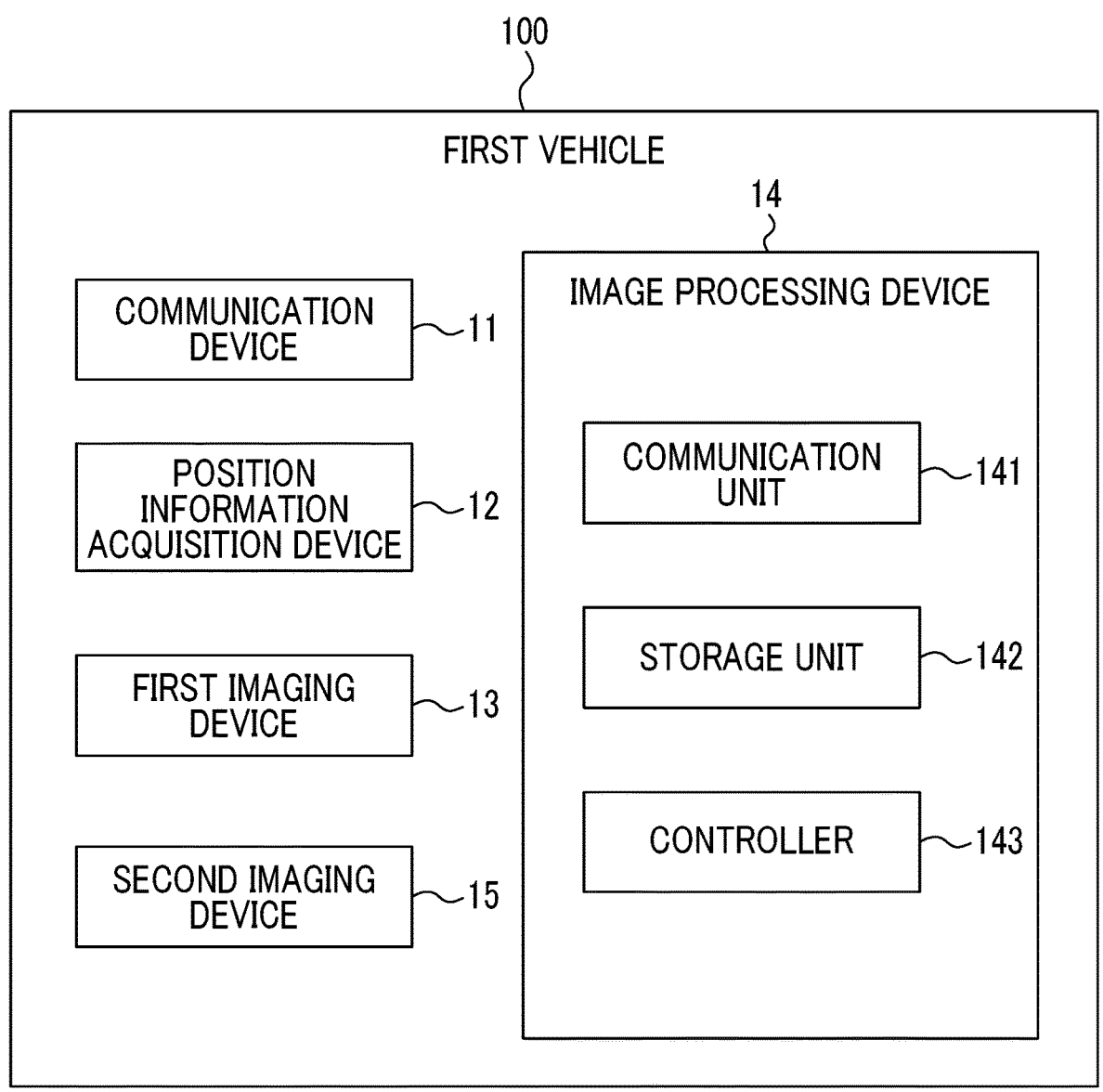
FIG. 10 is a block diagram showing a schematic configuration of a first vehicle according to a second embodiment.

Next, the information processing system 1 according to a second embodiment of the present disclosure will be described. For example, as shown in FIG. 10, a first vehicle 100 according to the second embodiment is different from the first vehicle 10 according to the first embodiment described above in that the first vehicle 100 is further provided with a second imaging device 15. The communication device 11, the position information acquisition device 12, the first imaging device 13, the image processing device 14, and the second imaging device 15 are connected to each other in a communicable manner through, for example, an on-vehicle network such as the CAN or a dedicated line. In the second embodiment, the details of the operation of the image processing device 14 are different from those of the first embodiment. Hereinafter, the same reference numeral is assigned to the same configuration as the first embodiment, and the description thereof is omitted.

The second imaging device 15 is a device that generates a video obtained by imaging a subject in the field of view. The second imaging device 15 generates a second video obtained by imaging the outside scenery in a second direction different from a first direction when viewed from the first vehicle 100. The "first direction" and the "second direction" in the embodiment are respectively described as the front and the rear viewed from the first vehicle 100 but are not limited thereto. The second imaging device 15 may be, for example; an on-vehicle camera (rear camera) to be used for the driving assistance of the vehicle, or the like. In the second embodiment, the first vehicle 100 generates the second video obtained by imaging the outside scenery in the front viewed from the first vehicle 100 by using the second imaging device 15.

The communication unit 141 of the image processing device 14 acquires the first video and the second video from the first imaging device 13 and the second imaging device 15, respectively.

The controller 143 of the image processing device 14 detects a vehicle appearing on the second video as the second vehicle 40. Here, the controller 143 may detect a vehicle approaching the first vehicle 100 appearing on the second video as the second vehicle 40. The controller 143 extracts feature information indicating a feature of the second vehicle 40 from the second video. The feature information may include information such as a color, a decoration, or the like of the second vehicle 40, but is not limited thereto. The extraction of the feature information can be implemented using a predetermined image recognition algorithm.

When the vehicle appearing on the second video is detected as the second vehicle 40, the controller 143 starts the image recognition processing for detecting the appearance of the object on the first video. With the related configuration, the image recognition processing for detecting the appearance of the object on the first video is not executed until the second vehicle 40 is detected from the second video. Therefore, for example, when the second vehicle 40 is not detected from the second video, there is a low probability that the object appearing on the first video is erroneously detected as the second vehicle 40. As a result, it is possible to improve the detection precision of the appearance of the second vehicle 40 on the first video.

When the controller 143 detects that the object appears on the first video, the controller 143 determines whether the detected object is the second vehicle 40 using the feature information described above. When the object is determined to be the second vehicle 40, the controller 143 detects that the second vehicle 40 appears on the first video. Specifically, the controller 143 determines the identity between the object and the second vehicle 40 based on the consistency between a feature of the object detected on the first video and the feature of the second vehicle 40 indicated by the feature information. For example, when the feature of the object substantially matches the feature of the second vehicle 40, the controller 143 determines that the object is the second vehicle 40 and detects that the second vehicle 40 appears on the first video. With the related configuration, for example, even when an object different from the second vehicle 40 appears on the first video, there is a low probability that the object is erroneously detected as the second vehicle 40. As a result, it is possible to further improve the detection precision of the appearance of the second vehicle 40 on the first video.

The operation of the controller 143 after the appearance of the second vehicle 40 on the first video is detected is the same as that of the first embodiment described above. That is, the controller 143 implements the mask processing with respect to the first image area A on the first video. The controller 143 continues the implementation of the mask processing with respect to the first image area A until the controller 143 detects that the second vehicle 40 appears on the first video and then the specific part 41 (in the embodiment, license plate) of the second vehicle 40 appears on the first video. When the controller 143 detects that the second vehicle 40 appears on the first video and then the specific part 41 of the second vehicle 40 appears on the first video, the controller 143 ends the implementation of the mask processing with respect to the first image area A and implements the mask processing with respect to the second image area B on the first video.

Operation Flow of Image Processing Device

Figure 11:
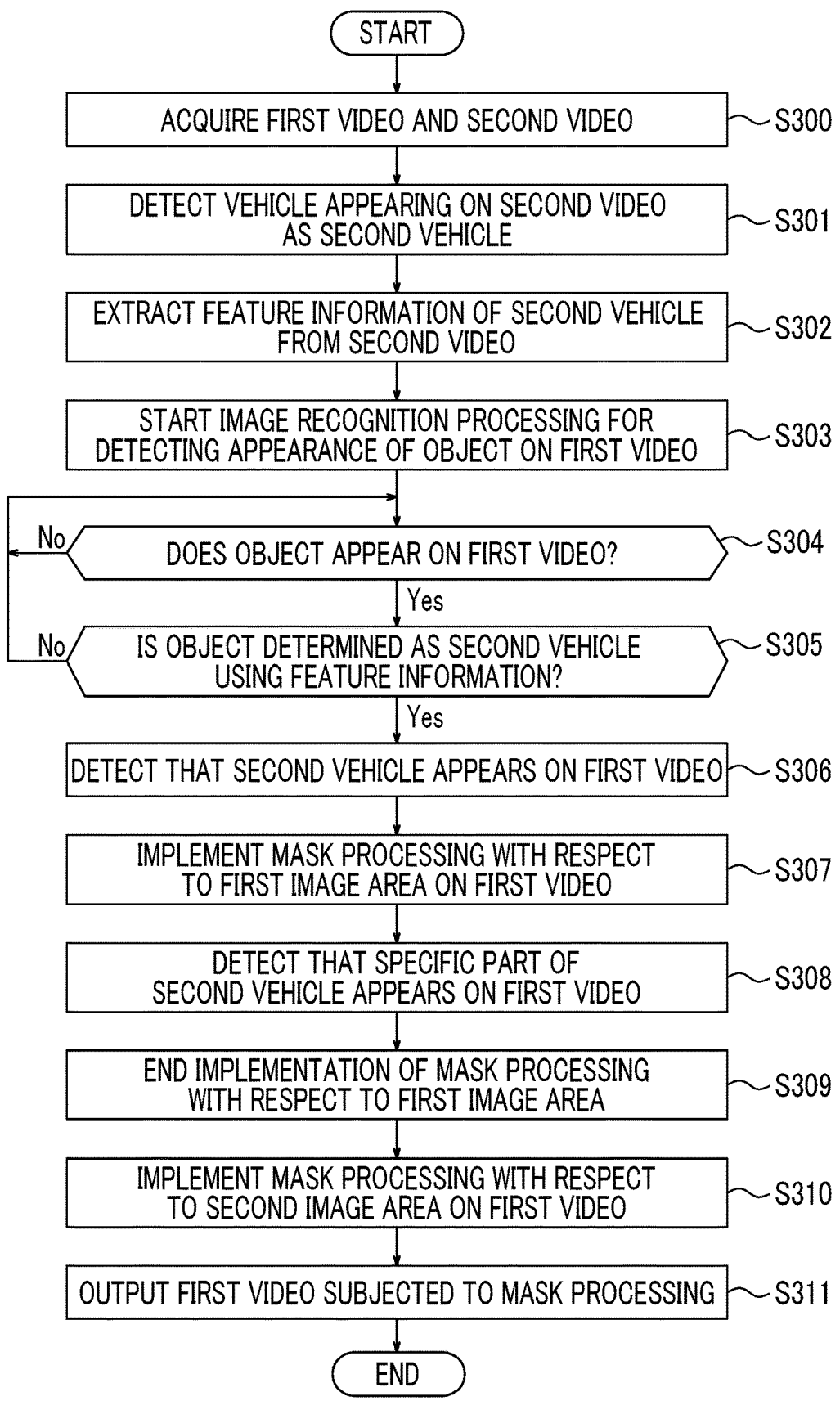
FIG. 11 is a flowchart showing an operation of an image processing device according to the second embodiment.

An operation flow of the image processing device 14 according to the second embodiment will be described with reference to FIG. 11.

Step S300: The communication unit 141 acquires the first video and the second video from the first imaging device 13 and the second imaging device 15, respectively.

Step S301: The controller 143 detects the vehicle appearing on the second video as the second vehicle 40.

Step S302: The controller 143 extracts the feature information of the second vehicle 40 from the second video.

Step S303: The controller 143 starts the image recognition processing for detecting the appearance of the object on the first video.

Step S304: The controller 143 determines whether the object appears on the first video. When determination is made that the object appears on the first video (Yes in step S304), the process proceeds to step S305. On the other hand, when determination is made that the object does not appear on the first video (No in step S304), the process repeats step S304.

Step S305: The controller 143 determines whether the detected object is the second vehicle 40 using the feature information in step S302. When the object is determined to be the second vehicle 40 (Yes in step S305), the process proceeds to Step S306. On the other hand, when the object is determined to not be the second vehicle 40 (No in step S305), the process returns to step S304.

Step S306: The controller 143 detects that the second vehicle 40 appears on the first video.

Step S307: The controller 143 decides the first image area A on the first video corresponding to at least apart of the second vehicle 40i on the first video to implement the mask processing with respect to the first image area A.

Step S308: The controller 143 detects that the second vehicle 40 appears on the first video and then the specific part 41 of the second vehicle 40 appears on the first video.

Step S309: The controller 143 ends the implementation of the mask processing with respect to the first image area A.

Step S310: The controller 143 decides the second image area B corresponding to the specific part 41i of the second vehicle 40i on the first video to implement the mask processing with respect to the second image area B.

Step S311: The controller 143 outputs the first video subjected to the mask processing through the communication unit 141.

As described above, the image processing device 14 according to the second embodiment acquires the first video and the second video obtained by respectively imaging the pieces of outside scenery in the first direction and the second direction when viewed from the first vehicle 100. The image processing device 14 detects the vehicle appearing on the second video as the second vehicle 40 and extracts the feature information of the second vehicle 40 from the second video. When the image processing device 14 detects that the object appears on the first video, the image processing device 14 determines whether the object is the second vehicle 40 using the feature information. With the related configuration, for example, even when the object different from the second vehicle 40 appears on the first video, there is a low probability that the object is erroneously detected as the second vehicle 40. Therefore, it is possible to improve the detection precision of the appearance of the second vehicle 40 on the first video compared with the first embodiment described above.

Third Embodiment

Figure 12:
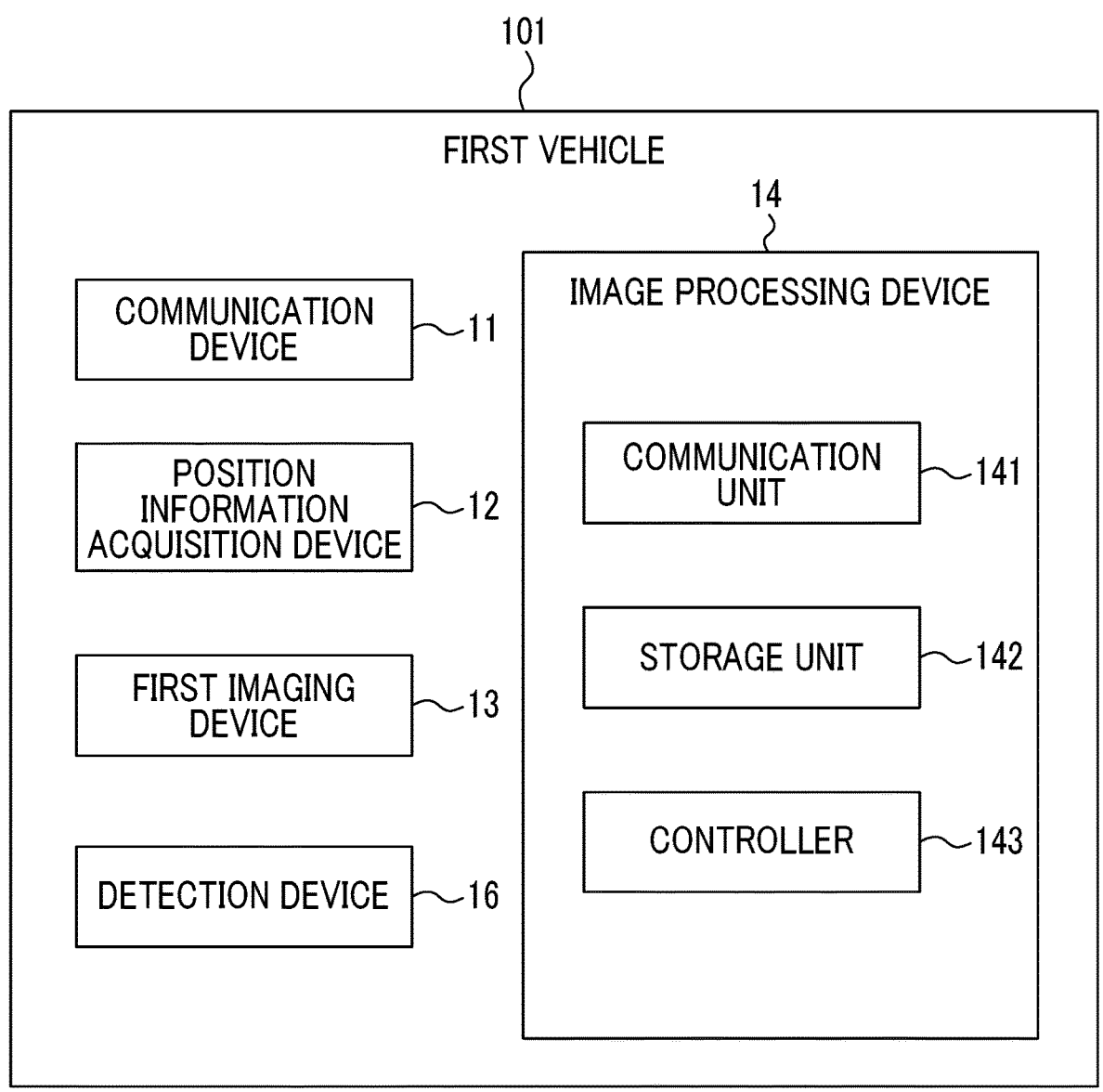
FIG. 12 is a block diagram showing a schematic configuration of a first vehicle according to a third embodiment.

Next, the information processing system 1 according to a third embodiment of the present disclosure will be described. For example, as shown in FIG. 12, a first vehicle 101 according to the third embodiment is different from the first vehicle 10 according to the first embodiment described above in that the first vehicle 101 is further provided with a detection device 16. The communication device 11, the position information acquisition device 12, the first imaging device 13, the image processing device 14, and the detection device 16 are connected to each other in a communicable manner through, for example, an on-vehicle network such as the CAN or a dedicated line. In the third embodiment, the details of the operation of the image processing device 14 are different from those of the first embodiment. Hereinafter, the same reference numeral is assigned to the same configuration as the first embodiment, and the description thereof is omitted.

The detection device 16 is a device that detects an object approaching the first vehicle 101 from a second direction different from a first direction when viewed from the first vehicle 101. The "first direction" and the "second direction" in the embodiment are respectively described as the front and the rear viewed from the first vehicle 101 but are not limited thereto.

For example, the detection device 16 may include a distance sensor such as an ultrasonic sonar or a millimeter wave radar. In the related case, the detection device 16 can detect the object approaching the first vehicle 101 based on an output signal of the distance sensor. In addition, for example, the detection device 16 may include a communication module that performs inter-vehicle communication. In the related case, the detection device 16 may perform the inter-vehicle communication with a vehicle existing in the rear of the first vehicle 101 to, detect that the vehicle approaches the first vehicle 101 based on position information of each other or to receive a notification that the vehicle approaches the first vehicle 101.

When the detection device 16 detects the object approaching the first vehicle 101 from the rear viewed from the first vehicle 101, the detection device 16 notifies the image processing device 14 that the object is detected.

The communication unit 141 of the image processing device 14 acquires the notification, from the detection device 16, that the object approaching the first vehicle 101 from the rear viewed from the first vehicle 101 is detected.

The controller 143 starts the image recognition processing for detecting the appearance of the second vehicle 40 on the first video in response to the acquisition of the notification. With the related configuration, the image recognition processing for detecting the appearance of the second vehicle 40 on the first video is not executed until the object approaching the first vehicle 101 from the second direction is detected. Therefore, for example, when the object approaching the first vehicle 101 from the second direction is not detected, there is a low probability that the object appearing on the first video is erroneously detected as the second vehicle 40. As a result, it is possible to improve the detection precision of the appearance of the second vehicle 40 on the first video. In addition, there is no need for the controller 143 to execute the image recognition processing for detecting the appearance of the second vehicle 40 on the first video until the notification is acquired from the detection device 16. Therefore, it is possible to reduce a processing load of the controller 143.

The operation of the controller 143 after the appearance of the second vehicle 40 on the first video is detected is the same as that of the first embodiment described above. That is, the controller 143 implements the mask processing with respect to the first image area A on the first video. The controller 143 continues the implementation of the mask processing with respect to the first image area A until the controller 143 detects that the second vehicle 40 appears on the first video and then the specific part 41 (in the embodiment, license plate) of the second vehicle 40 appears on the first video. When the controller 143 detects that the second vehicle 40 appears on the first video and then the specific part 41 of the second vehicle 40 appears on the first video, the controller 143 ends the implementation of the mask processing with respect to the first image area A and implements the mask processing with respect to the second image area B on the first video.

Operation Flow of Image Processing Device

Figure 13:
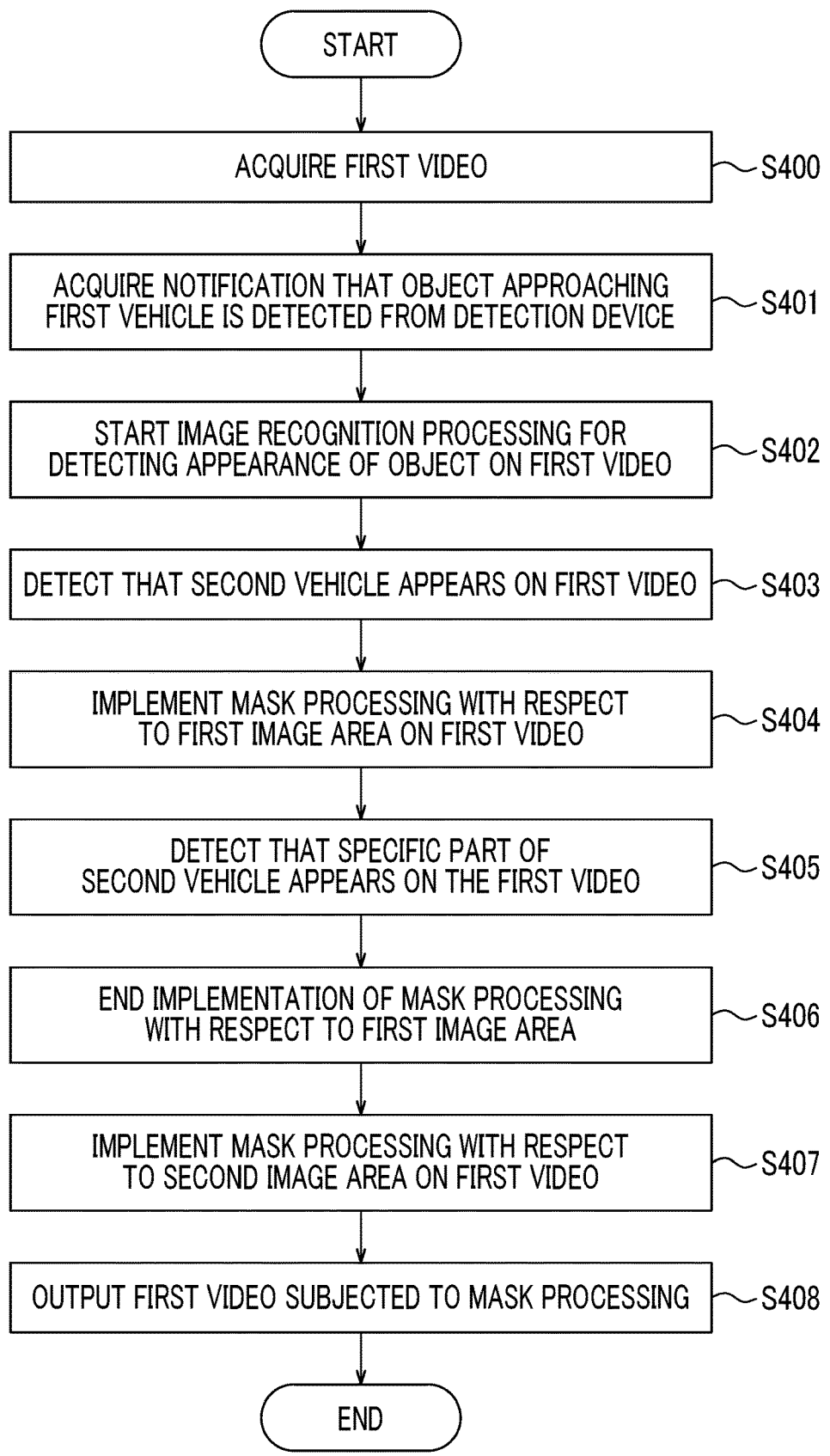
FIG. 13 is a flowchart showing an operation of an image processing device according to the third embodiment.

An operation flow of the image processing device 14 according to the third embodiment will be described with reference to FIG. 13.

Step S400: The communication unit 141 acquires the first video from the first imaging device 13.

Step S401: The communication unit 141 acquires the notification, from the detection device 16, that the object approaching the first vehicle 101 from the second direction when viewed from the first vehicle 101 is detected.

Step S402: The controller 143 starts the image recognition processing for detecting the appearance of the object on the first video in response to the acquisition of the notification in step S401.

Step S403: The controller 143 detects that the second vehicle 40 appears on the first video.

Step S404: The controller 143 decides the first image area A on the first video corresponding to at least a part of the second vehicle 40i on the first video to implement the mask processing with respect to the first image area A.

Step S405: The controller 143 detects that the second vehicle 40 appears on the first video and then the specific part 41 of the second vehicle 40 appears on the first video.

Step S406: The controller 143 ends the implementation of the mask processing with respect to the first image area A.

Step S407: The controller 143 decides the second image area B corresponding to the specific part 41i of the second vehicle 40i on the first video to implement the mask processing with respect to the second image area B.

Step S408: The controller 143 outputs the first video subjected to the mask processing through the communication unit 141.

As described above, the image processing device 14 according to the third embodiment acquires the notification that the object approaching the first vehicle 101 from the second direction different from the first direction when viewed from the first vehicle 101 is detected. The image processing device 14 starts the image recognition processing for detecting the appearance of the second vehicle 40 on the first video in response to the acquisition of the notification. With the related configuration, the image recognition processing for detecting the appearance of the second vehicle 40 on the first video is not executed until the object approaching the first vehicle 101 from the second direction is detected. Therefore, for example, when the object approaching the first vehicle 101 from the second direction is not detected, there is a low probability that the object appearing on the first video is erroneously detected as the second vehicle 40. As a result, it is possible to improve the detection precision of the appearance of the second vehicle 40 on the first video. In addition, there is no need for the image processing device 14 to execute the image recognition processing for detecting the appearance of the second vehicle 40 on the first video until the notification is acquired. Therefore, it is possible to reduce a processing load of the image processing device 14.

The present disclosure is described based on the drawings and the examples, but it should be noted that those skilled in the art easily perform various modifications and changes based on the disclosure. Therefore, it should be noted that those modifications and changes are included in the gist of the present disclosure. For example, each means, the function included in each step, or the like can be rearranged so as not to be logically contradictory, and a plurality of means, steps, or the like can be combined or divided.

For example, in the embodiment described above, another device may have respective configurations and a part of the functions of the communication device 11, the position information acquisition device 12, the first imaging device 13, the image processing device 14, the second imaging device 15, and the detection device 16 provided in the first vehicles 10, 100, 101. In addition, for example, a part of processing operations to be executed by the first vehicles 10, 100, 101 in the embodiment described above may be executed by the server 20, and a part of processing operations to be executed by the server 20 may be executed by the first vehicles 10, 100, 101. For example, detection processing of the appearance of the second vehicle 40 and the specific part 41 on the first video, the mask processing with respect to the first image area A and the second image area B, and the like can be executed by the server 20 instead of the first vehicles 10, 100, 101.

In the embodiment described above, the specific part 41 of the second vehicle 40 is the license plate. However, the specific part 41 is not limited to the license plate and may be a predetermined part of the second vehicle 40 needed to be subjected to the mask processing from the viewpoint of the personal information protection. For example, a window of the second vehicle 40 may be considered as the specific part 41.

In the embodiment described above, the first direction and the second direction are respectively the front and the rear of the first vehicles 10, 100, 101. However, the first direction and the second direction are not limited thereto and may be predetermined directions different from each other viewed from the first vehicle 10. For example, the first direction and the second direction may be respectively the rear and the front of the first vehicles 10, 100, 101 or may be respectively the right and the left thereof.

In the first embodiment described above, the second vehicle 40 is the vehicle passing the first vehicle 10 from, the rear. However, the second vehicle 40 is not limited to the passing vehicle. For example, the second vehicle 40 may be a vehicle that enters into the field of view from a blind spot of the first imaging device 13 of the first vehicle 10.

In the third embodiment described above, the detection device 16 that detects the object approaching the first vehicle 101 from the second direction different from the first direction when viewed from the first vehicle 101 is provided in the first vehicle 101. However, the server 20 may have the function of the detection device 16. In the related case, the server controller 23 recognizes a relative position relationship of a plurality of vehicles including the first vehicle 101 with reference to, for example, the database of the server storage unit 22 to determine whether the vehicle approaching the first vehicle 101 from the second direction when viewed from the first vehicle 101 is detected. When the server controller 23 detects the vehicle approaching the first vehicle 101 from the second direction when viewed from the first vehicle 101, the server controller 23 transmits the notification that the vehicle is detected to the first vehicle 101 through the server communication unit 21. Here, when feature information of the vehicle is stored in the server storage unit 22, the server controller 23 may transmit the feature information to the first vehicle 101 together with the notification. With the related configuration, similarly to the second embodiment described above, it is possible to improve the detection precision of the appearance of the second vehicle 40 on the first video.

A general-purpose information processing device such as a smartphone or a computer may function as the communication device 11, the position information acquisition device 12, the first imaging device 13, the image processing device 14, the second imaging device 15, the detection device 16, or the server 20 according to the embodiment described above. Specifically, a program in which the processing contents for realizing each function of the communication device 11 and the like according to the embodiment are described is stored in the memory of the information processing device, and a processor of the information processing device reads and executes the program. Therefore, an applicable embodiment of the present disclosure can also be realized as the program that can be executed by the processor.

What is claimed is:

1. An image processing device comprising:
a communication device; and
a processor,
wherein the processor is configured to
acquire a first video obtained by imaging outside scenery of a first vehicle by using the communication device,
when the processor detects that a second vehicle other than the first vehicle appears on the first video, implement image processing that degrades visibility of a video with respect to a first image area encompassing an entirety of the second vehicle appearing on the first video until an entirety of a specific part of the second vehicle appears on the first video, and
when the processor detects that the entirety of the specific part of the second vehicle appears on the first video, end the image processing with respect to the first image area and implement image processing that degrades visibility of a video with respect to a second image area corresponding to the specific part of the second vehicle on the first video.

2. The image processing device according to claim 1, wherein the specific part of the second vehicle includes at least one of a license plate and a window of the second vehicle.

3. The image processing device according to claim 1, wherein:
the first video is a video obtained by imaging outside scenery in a first direction when viewed from the first vehicle; and
the processor is configured to
further acquire a second video obtained by imaging outside scenery in a second direction different from the first direction when viewed from the first vehicle by using the communication device,
detect a vehicle appearing on the second video as the second vehicle,
extract feature information indicating a feature of the second vehicle from the second video, and
when the processor detects that an object appears on the first video, determine whether the object is the second vehicle using the feature information.

4. The image processing device according to claim 3, wherein the processor is configured to detect a vehicle appearing on the second video and approaching the first vehicle as the second vehicle.

5. The image processing device according to claim 3, wherein the processor is configured to, when the processor detects the vehicle appearing on the second video as the second vehicle, start image recognition processing for detecting the appearance of the object on the first video.

6. The image processing device according to claim 1, wherein:
the first video is a video obtained by imaging outside scenery in a first direction when viewed from the first vehicle; and
the processor is configured to
acquire a notification that an object approaching the first vehicle from a second direction different from the first direction when viewed from the first vehicle is detected by using the communication device, and
start image recognition processing for detecting the appearance of the second vehicle on the first video in response to the acquisition of the notification.

7. A non-transitory readable recording medium storing a program for causing a processor to execute a control method of an image processing device including the processor and a communication device, in which the program causes the processor to execute a control process of the image processing device, the control process comprising:
acquiring a first video obtained by imaging outside scenery of a first vehicle by using the communication device;
when detection is made that a second vehicle appears on the first video, implementing image processing that degrades visibility of a video with respect to a first image area encompassing an entirety of the second vehicle appearing on the first video until an entirety of a specific part of the second vehicle appears on the first video; and
when detection is made that the entirety of the specific part of the second vehicle appears on the first video, ending the image processing with respect to the first image area and implementing image processing that degrades visibility of a video with respect to a second image area corresponding to the specific part of the second vehicle on the first video.

8. An information processing system comprising:
a first vehicle; and
a server configured to communicate with the first vehicle, wherein:
the first vehicle is configured to transmit a first video obtained by imaging outside scenery to the server;
the first vehicle or the server is configured to
when the first vehicle or the server detects that a second vehicle appears on the first video, implement image processing that degrades visibility of a video with respect to a first image area encompassing an entirety of the second vehicle appearing on the first video until an entirety of a specific part of the second vehicle appears on the first video, and
when the first vehicle or the server detects that the entirety of the specific part of the second vehicle appears on the first video, end the image processing with respect to the first image area and implement image processing that degrades visibility of a video with respect to a second image area corresponding to the specific part of the second vehicle on the first video; and the server is configured to transmit the first video to a client.

9. A control method of an image processing device including a communication device and a processor, the control method comprising:
acquiring a first video obtained by imaging outside scenery of a first vehicle by using the communication device by the processor;
when detection is made that a second vehicle appears on the first video, implementing image processing that degrades visibility of a video with respect to a first image area encompassing an entirety of the second vehicle appearing on the first video by the processor until an entirety of a specific part of the second vehicle appears on the first video; and
when detection is made that the entirety of the specific part of the second vehicle appears on the first video, ending the image processing with respect to the first image area and implementing image processing that degrades visibility of a video with respect to a second image area corresponding to the specific part of the second vehicle on the first video by the processor.

* * * * *